I. D. PERRY.
LOCKING DEVICE FOR AUTOMOBILES.
APPLICATION FILED JAN. 14, 1916.
1,284,761.
Patented Nov. 12, 1918.
3 SHEETS—SHEET 2.
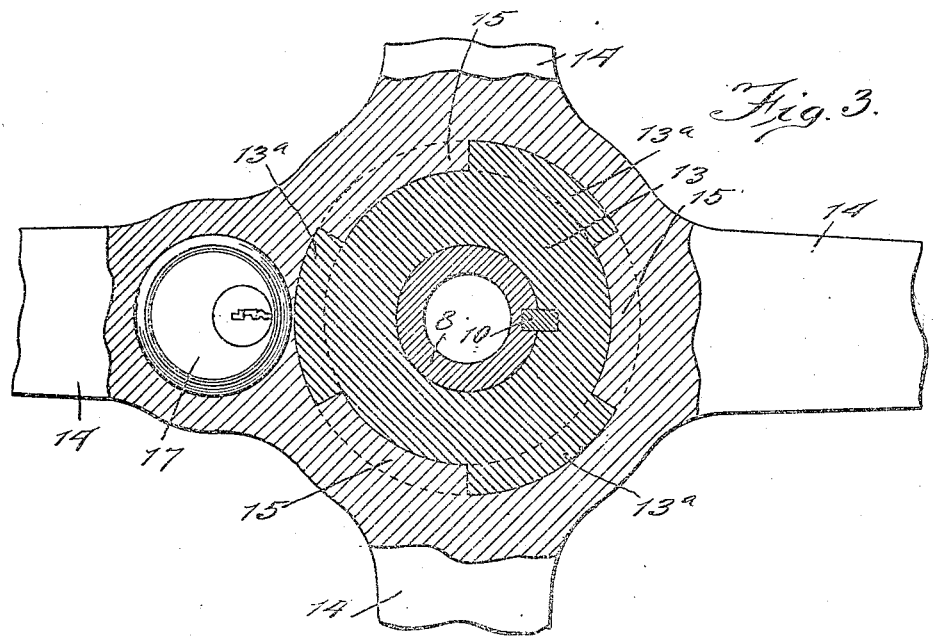
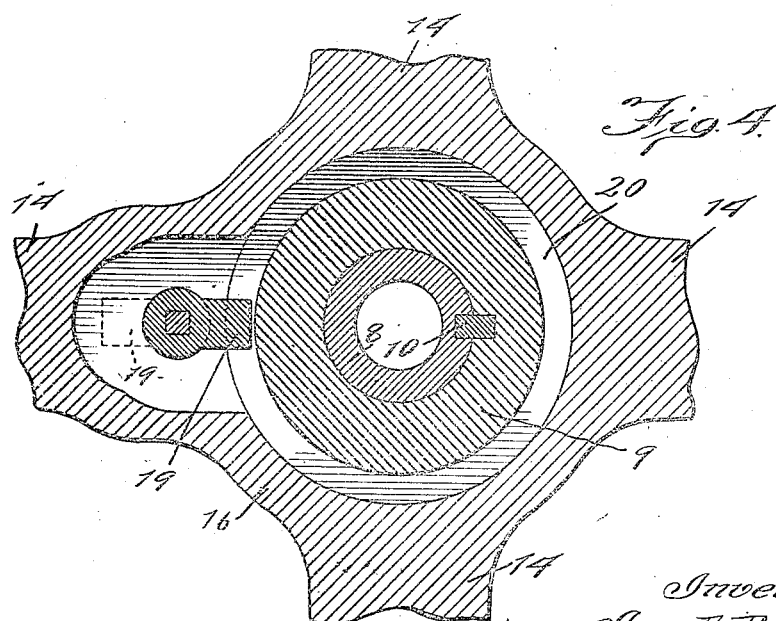
Inventor.
Ira D. Perry
By Frank H Drury
Att.

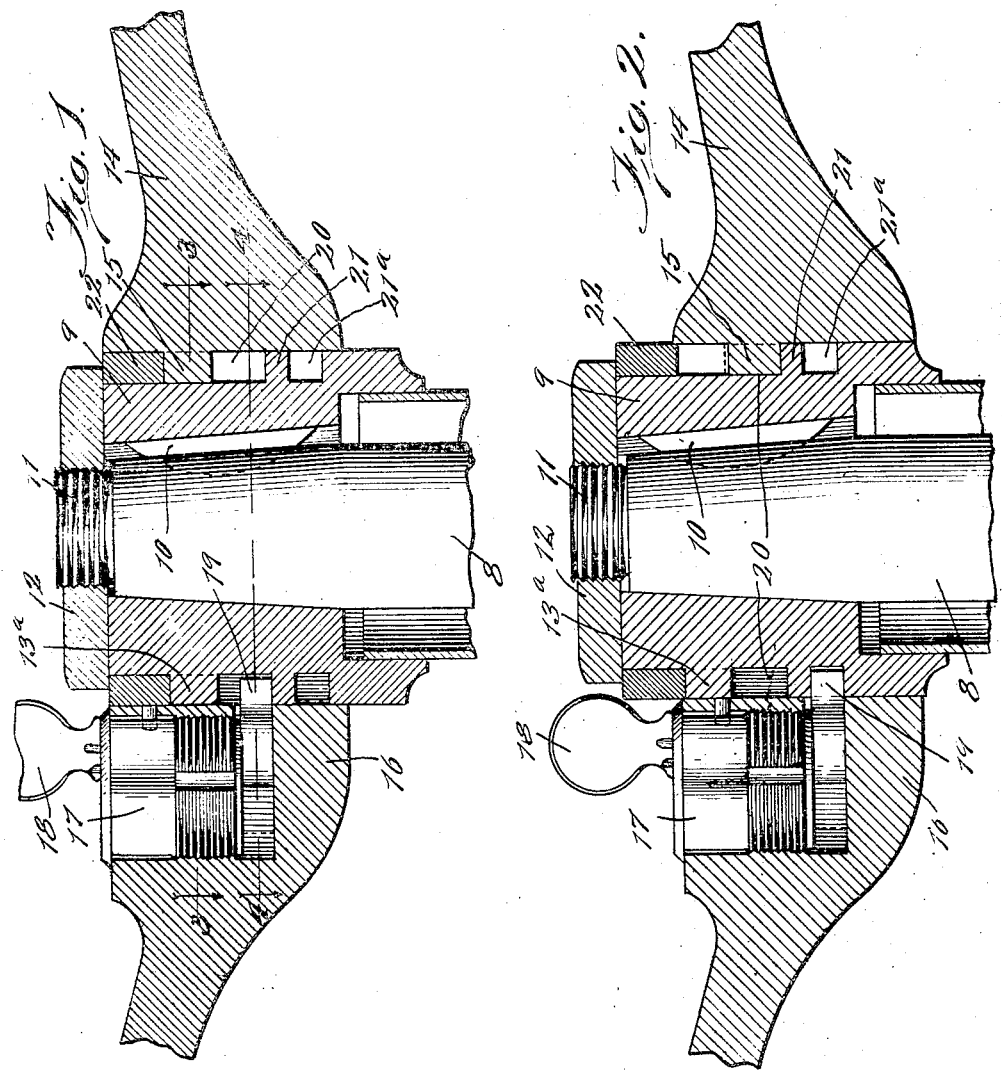

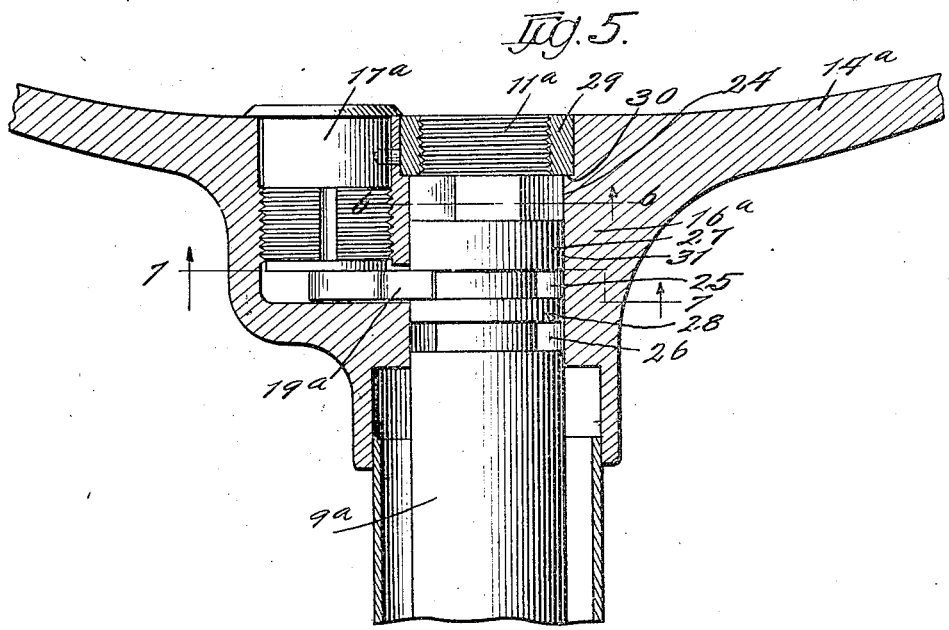
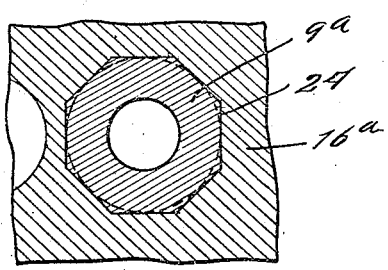
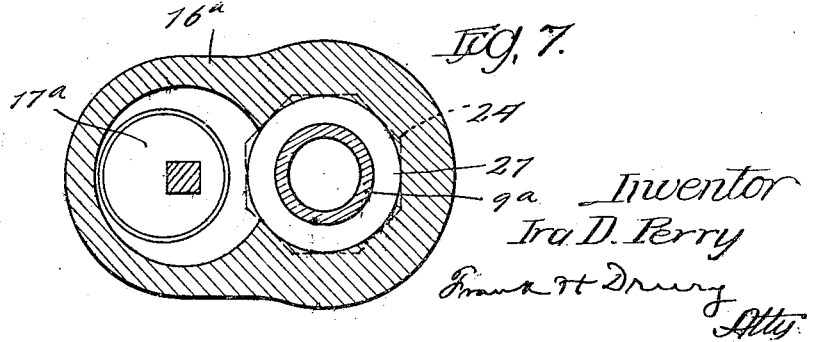

UNITED STATES PATENT OFFICE.

IRA D. PERRY, OF CHICAGO, ILLINOIS, ASSIGNOR, BY MESNE ASSIGNMENTS, TO PERRY AUTO LOCK COMPANY.

LOCKING DEVICE FOR AUTOMOBILES.

1,284,761.  Specification of Letters Patent.  Patented Nov. 12, 1918.

Application filed January 14, 1916. Serial No. 72,053.

*To all whom it may concern:*

Be it known that I, IRA D. PERRY, a citizen of the United States, residing at Chicago, in the county of Cook and State of Illinois, have invented new and useful Improvements in Locking Devices for Automobiles, of which the following is a full, clear, concise, and exact description, reference being had to the accompanying drawings, forming a part of this specification.

My invention relates to improvements in locking devices for automobiles, having especial reference to means for locking the steering wheel, and has for its object the production of a device by means of which the steering wheel of an automobile may be locked in operative or inoperative position.

A further object is the production of a device that can be adjusted to cars now in use, and one involving few operative parts.

A further object is the production of a device that can be cheaply constructed and is not liable to get out of order.

These and such other objects as may hereinafter appear are attained by my device, embodiments of which are illustrated in the accompanying drawings, in which—

Figure 1 represents a vertical sectional view of my device in operative position;

Fig. 2 represents a vertical sectional view of my device in inoperative position;

Fig. 3 represents a sectional view on the line 3—3 of Fig. 1 looking in the direction indicated by the arrows;

Fig. 4 represents a sectional view on the line 4—4 of Fig. 1 looking in the direction indicated by the arrows;

Fig. 5 represents a vertical sectional view of a modified form of my device in operative position;

Fig. 6 represents a sectional view on the line 6—6 of Fig. 5 looking in the direction indicated by the arrows;

Fig. 7 represents a sectional view on the line 7—7 of Fig. 5 looking in the direction indicated by the arrows.

Like numerals of reference indicate like parts in the several figures of the drawings.

Referring now to the drawings, 8 represents the steering post of an automobile having a special hub 9 keyed thereon in any suitable manner, as for instance, by a key 10. The top of the post is screw threaded as shown at 11 and a retaining nut 12 is screwed thereon holding the hub in place. The hub as shown is provided with an annular exterior flange 13 having portions cut away, as shown at 13ª, 13ª, forming in effect an interrupted flange. This is shown in cross-section in Fig. 3 and its purpose is to hold the wheel in operative position. The spider 14 of the steering wheel is provided with an interiorly projecting interrupted flange, the projecting portions 15 of which interlock with the members 13ª, 13ª, these members, or teeth, as it were, fitting between or beside the adjacent members 15, 15. Fitting or screwed within the inner rim 16 of the spider and adjacent the hub 9 is a lock 17, the key 18 of which actuates the locking bolt 19, which when the steering wheel is in operative position fits within the peripheral groove 20 of the hub and rests on the annular flange 21 preferably integral with said hub.

When the machine is stopped and it is desired to lock it against use, the key 18 is inserted in the lock 17 and the bolt 19 turned off of the flange 21. At the moment the bolt passes off the flange, the spider and wheel drop away from the ring 22 and out of engagement with the members 13ª, assuming the position shown in Fig. 2 with the interrupted flange 15 resting on the annular flange 21 and within the annular groove 20. The locking bolt is then turned into the locking groove 21ª in the hub below the flange 21, and the key withdrawn.

In this position there is no locking engagement between the wheel and the hub save that the lower surface of the locking flange 21 prevents any upward movement of the bolt or wheel, but the annular grooves 21ª—20 permit a free revolution of the wheel on the steering post. In this position it is clear that it is absolutely impossible to operate the steering post and consequently the car is safe from theft.

In Figs. 5, 6 and 7, I have shown a modified form in which the steering post 9ª is formed at the top with an angular portion (shown as octagonal) 24 and with two annular grooves 25, 26 below and a corresponding circular flange 27 between the top portion and the groove 25 and a circular flange 28 between the grooves 25 and 26. The inner rim 16ª of the spider 14ª is held in position on the shaft by means of a nut 29 screwed on the threaded end 11ª and the upper portion of the bore of the rim below the shoulder 30 on which the nut rests is of an angular cross-section (shown as octagonal) adapted to fit snugly the angular portion 24 of the steering post, while just below the angular portion of the bore of the rim is circular as shown at 31, fitting snugly the flange 27.

The lock 17ª fits within the rim and is provided with a locking bolt 19ª shown in Fig. 5 as fitting within the groove 25 and resting on the top of the flange 28.

The angular portion of the hub and rim being held in engagement, the steering post may be turned and the automobile steered at will. When the car is stopped and it is desired to lock the same against use or theft, the bolt 19ª is turned out of the groove 25, and the wheel then drops until 19ª registers with 26. The bolt 19ª is then turned into the groove 26 thus locking the wheel from removal from the post and yet permitting its free revolution on the post, the same as in the construction shown in Figs. 1 to 4.

It is to be noted that when the locking bolt is withdrawn, the wheel is free to move longitudinally, that is, its movement is unimpeded, and when in the claims the words "freely movable" occur, it is to be understood that such movement is unimpeded movement.

Much trouble has been occasioned by thefts in automobiles when the wheel is locked by chain and padlock, it being a simple matter to break the chain or lock, but with my improved construction without a key there is no danger of the car being put into commission after it is locked, and by the use of a pin cylinder lock, danger of picking the lock is eliminated.

I am aware that numerous modifications are possible by the use of which the results secured by my device may be attained, but any means for locking the wheel and steering post in operative or inoperative position at will comes within the scope of my invention.

Having thus described my invention, what I claim as new and desire to secure by Letters Patent is:

1. In a device of the class described, the combination with a steering post, a wheel mounted thereon, and movable from a first operative position to a second inoperative position, means whereby when said wheel is in said first position rotation of said wheel will cause rotation of said post, and whereby when said wheel is in said second position rotation of said wheel will not cause rotation of said post, and a lock set within said wheel for locking said wheel in operative or inoperative position on said post.

2. In a device of the class described, the combination with a steering post, a wheel, a hub interposed between said wheel and steering post and secured to the steering post, said wheel being slidable on said hub from operative to inoperative position, and means for locking said wheel in operative and inoperative positions comprising a locking member, and means integral with said hub for engaging said locking member.

3. In a device of the class described, the combination with a steering post, a wheel, a hub interposed between said wheel and steering post and secured to the steering post, said wheel being slidable on said hub from operative to inoperative position, and means for locking said wheel in operative and inoperative positions comprising a locking member mounted within said wheel, and means integral with said hub for engaging said locking member.

4. In a device of the class described, the combination with a steering post, a hub rigidly mounted thereon, a wheel mounted on said hub, said wheel being slidable on said hub from operative to inoperative position, and means for locking said wheel in either of said positions comprising a locking member, and a flange projecting from said hub for engagement with said locking member.

5. In a device of the class described, the combination with a steering post, a hub rigidly mounted thereon, a wheel mounted on said hub, said wheel being slidable on said hub from operative to inoperative position, and means for locking said wheel in either of said positions comprising a locking member, and a flange integral with said hub for engaging said locking member, said hub having a mutilated flange and said wheel having portions for engagement with said mutilated flange.

6. In a device of the class described, the combination with a steering post, a hub mounted thereon, a plurality of flanges extending from the outer face of said hub, one of said flanges being cut away forming an interrupted flange, a wheel mounted on said hub, interiorly projecting flanges on the inner bore of said wheel adapted to be thrown into and out of engagement with said interrupted flange on the hub and locking means for holding said parts in operative or inoperative position.

7. In a device of the class described, the combination with a steering post, a hub mounted thereon, a plurality of flanges extending from the outer face of said hub, one of said flanges being cut away forming an interrupted flange, a wheel mounted on said hub, interiorly projecting flanges on the inner bore of said wheel adapted to be thrown into and out of engagement with said interrupted flange on the hub, and locking means mounted in said wheel, said locking means being adapted to hold said wheel in operative or inoperative position on said hub.

8. In a device of the class described, the combination with a steering post having a threaded top, a hub keyed thereon, a wheel mounted on said hub, a nut screwed to the top of said post holding said hub and wheel on said post, said hub and wheel being provided with interlocking members, and a lock adapted to hold said wheel in either operative or inoperative position.

9. In a device of the class described, the combination with a steering post having a threaded top, a hub keyed thereon, a wheel mounted on said hub, a nut screwed to the top of said post holding said hub and wheel on said post, said hub and wheel being provied with interlocking members and a lock mounted within said wheel adapted to hold said wheel in either operative or inoperative position.

10. In a device of the class described, the combination with a steering post having a threaded top, a hub keyed thereon, a wheel mounted on said hub, a nut screwed to the top of said post holding said hub and wheel on said post, said hub and wheel being provided with interlocking members integral therewith, and a lock adapted to hold said wheel in either operative or inoperative position.

11. In a device of the class described, the combination with a steering post having a threaded top, a hub keyed thereon, a wheel mounted on said hub, a nut screwed to the top of said post holding said hub and wheel on said post, said hub and wheel being provided with interlocking members integral therewith and a lock mounted within said wheel adapted to hold said wheel in either operative or inoperative position.

12. In a steering device for vehicles, a steering post, a steering wheel mounted to move longitudinally with respect to the axis of said post from the first to a second position, means whereby when said wheel is in said first position rotation of said wheel will cause rotation of said post, and whereby when said wheel is in said second position rotation of said wheel will not cause rotation of said post, and means for holding said wheel in either of said two positions comprising two shoulders and a locking member movable into engagement with one of said shoulders to hold the wheel in one position and with the other of said shoulders to hold the wheel in the other position.

13. In a steering device for vehicles, a steering post, a steering wheel mounted to move longitudinally with respect to the axis of said post from a first to a second position, means whereby when said wheel is in said first position rotation of said wheel will cause rotation of said post, and whereby when said wheel is in said second position rotation of said wheel will not cause rotation of said post, and means for holding said wheel in either of said two positions comprising two annular shoulders concentric with said post and a locking member movable into engagement with one of said shoulders to hold the wheel in one position and with the other of said shoulders to hold the wheel in the other position.

14. In a steering device for vehicles, a steering post, a steering wheel mounted to move longitudinally with respect to the axis of said post from a first to a second position, means whereby when said wheel is in said first position rotation of said wheel will cause rotation of said post, and whereby when said wheel is in said second position rotation of said wheel will not cause rotation of said post, and releasable retaining means for holding said wheel in either of said two positions, said wheel being freely movable longitudinally with respect to said post when said retaining means are released.

15. In a steering device for vehicles, a steering post, a steering wheel mounted to move longitudinally with respect to the axis of said post from a first to a second position, means whereby when said wheel is in said first position rotation of said wheel will cause rotation of said post, and whereby when said wheel is in said second position rotation of said wheel will not cause rotation of said post, comprising members moved into and out of engagement with each other by the longitudinal movement of the wheel, and releasable retaining means for holding said wheel in either of said two positions, said wheel being freely movable longitudinally with respect to the axis of said post when said retaining means are released.

16. In a steering device for vehicles, a steering post, a steering wheel mounted to move longitudinally with respect to said post from a first to a second position, means whereby when said wheel is in said first position rotation of said wheel will cause rotation of said post, and whereby when said wheel is in said second position rotation of said wheel will not cause rotation of said post, and means for holding said wheel in either of said two positions comprising two shoulders and a locking member movable in a plane substantially at right angles to the axis of the steering post into engagement with one of said shoulders to hold the wheel in one position and with the other of said shoulders to hold the wheel in the other position.

17. In a steering device for vehicles, a steering post, a steering wheel mounted to move longitudinally with respect to the axis of said post from a first to a second position, means whereby when said wheel is in said first position rotation of said wheel will cause rotation of said post, and whereby when said wheel is in said second position rotation of said wheel will not cause rotation of said post comprising members moved into and out of engagement with each other by the movement of the wheel longitudinally with respect to the axis of said post, and means for holding said wheel in either of said two positions comprising two shoulders and a locking member movable into engagement with one of said shoulders to hold the wheel in one position and with the other of said shoulders to hold the wheel in the other position.

18. In a steering device for vehicles, a steering post, a steering wheel mounted to move longitudinally with respect to the axis of said post from a first to a second position, means whereby when said wheel is in said first position rotation of said wheel will cause rotation of said post, and whereby when said wheel is in said second position rotation of said wheel will not cause rotation of said post comprising two sets of members moved into and out of engagement with each other by the longitudinal movement of the wheel, and releasable retaining means for holding said wheel in either of said two positions, said wheel being freely movable longitudinally with respect to the axis of said post when said retaining means are released.

19. In a steering device for vehicles, a steering post, a steering wheel mounted to move longitudinally with respect to said post from a first to a second position, means whereby when said wheel is in said first position rotation of said wheel will cause rotation of said post, and whereby when said wheel is in said second position rotation of said wheel will not cause rotation of said post, and means for holding said wheel in either of said two positions comprising two shoulders and a key operated locking member mounted on the hub of the wheel movable into engagement with one of said shoulders to hold the wheel in one position and with the other of said shoulders to hold the wheel in the other position.

20. In a steering device for vehicles, a steering post, a steering wheel mounted to move longitudinally with respect to said post from a first to a second position, means whereby when said wheel is in said first position rotation of said wheel will cause rotation of said post, and whereby when said wheel is in said second position rotation of said wheel will not cause rotation of said post, and means for holding said wheel in either of said two positions comprising two shoulders and a key operated locking member mounted on the wheel movable into engagement with one of said shoulders to hold the wheel in one position and with the other of said shoulders to hold the wheel in the other position.

21. Steering apparatus embodying, in combination, a shaft, a grooved collar keyed to the shaft, a spoked wheel shiftably and idly mounted upon the shaft, the wheel being chambered in its hub and spoked portions, and arranged to receive the collar within its hub-chamber, interchangeable clutch elements carried by the wheel and collar for interlocking the wheel and shaft when the wheel is shifted to a definite position longitudinally of the shaft, and means positioned within the chambered portion of the wheel for positively holding the wheel in either locking or unlocking position upon the shaft.

22. Steering apparatus embodying, in combination, a shaft, a chambered wheel shiftably and idly mounted upon the shaft, interengageable clutch elements within the chambered portion of the wheel carried by the wheel and shaft and arranged to interlock the wheel and shaft when the wheel is shifted to a definite position longitudinally of the shaft, and means positioned within the chambered portion of the wheel for normally holding the wheel in locking position upon the shaft.

23. In a steering device for vehicles, a steering post, a steering wheel mounted to move longitudinally with respect to the axis of said post from a first to a second position, means whereby when said wheel is in said first position rotation of said wheel will cause rotation of said post, and whereby when said wheel is in said second position rotation of said wheel will not cause rotation of said post, and releasable retaining means for holding said wheel in either of said two positions, said wheel being capable of being freely or manually lifted or dropped longitudinally with respect to said post when said retaining means are released.

24. In a steering device for vehicles, a steering post, a steering wheel mounted to move longitudinally with respect to the axis of said post from a first to a second position, means whereby when said wheel is in said first position rotation of said wheel will cause rotation of said post, and whereby when said wheel is in said second position rotation of said wheel will not cause rotation of said post, composing members moved into and out of engagement with each other by the longitudinal movement of the wheel, and releasable retaining means for holding said wheel in either of said two positions, said wheel being capable of being freely lifted or dropped longitudinally with respect to said post when said retaining means are released.

In witness whereof, I have hereunto subscribed my name in the presence of two witnesses.

IRA D. PERRY.

Witnesses:
GEORGE V. DOMARUS, Jr.,
GEORGE GUTHIER.